Dec. 6, 1955　　　A. J. BROAD　　　2,725,875
APPARATUS FOR BURNING FIRE BREAKS IN OPEN GRASS COUNTRY
Original Filed Nov. 24, 1950　　　2 Sheets-Sheet 1
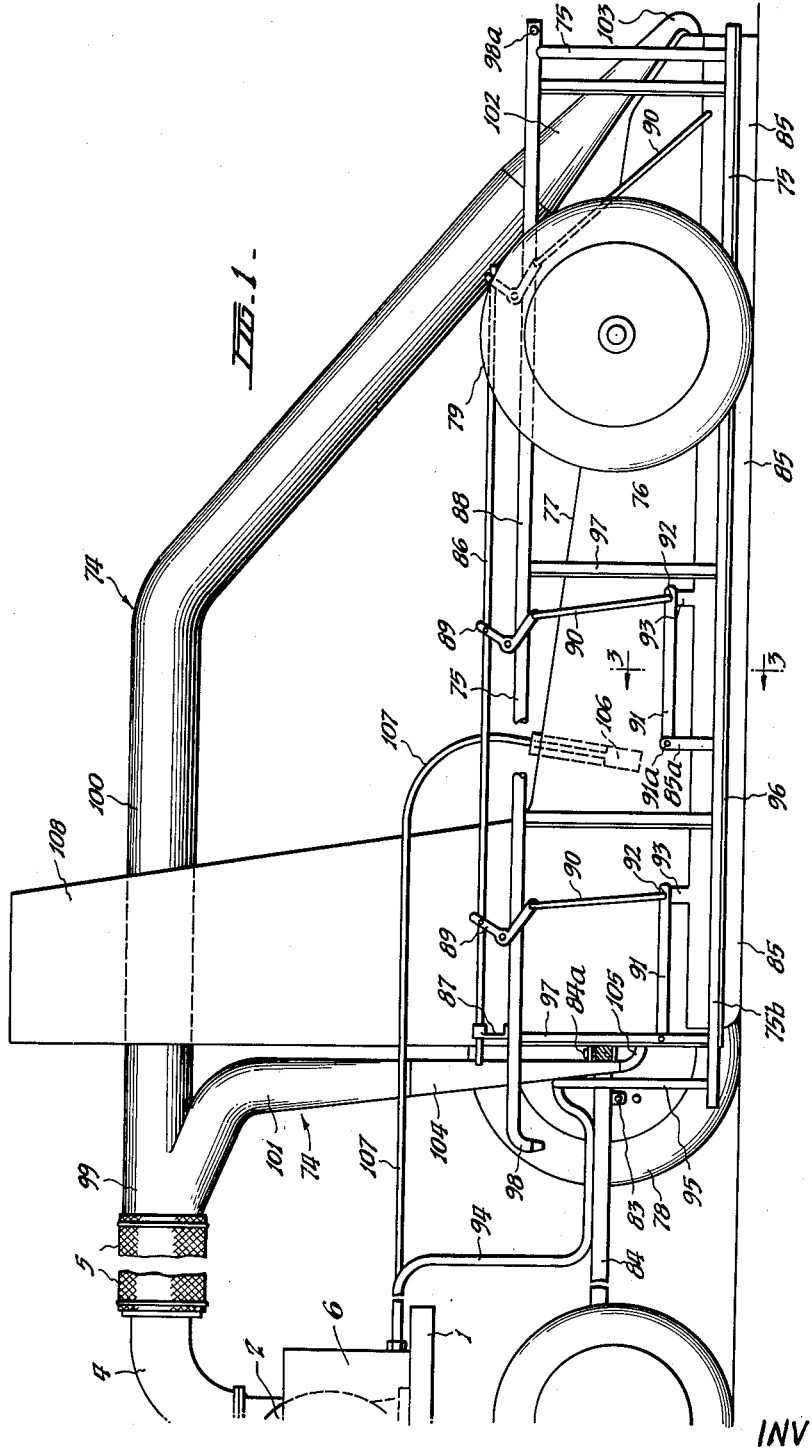
INVENTOR
ARTHUR JOHN BROAD
BY Haseltine, Lake & Co.
AGENTS

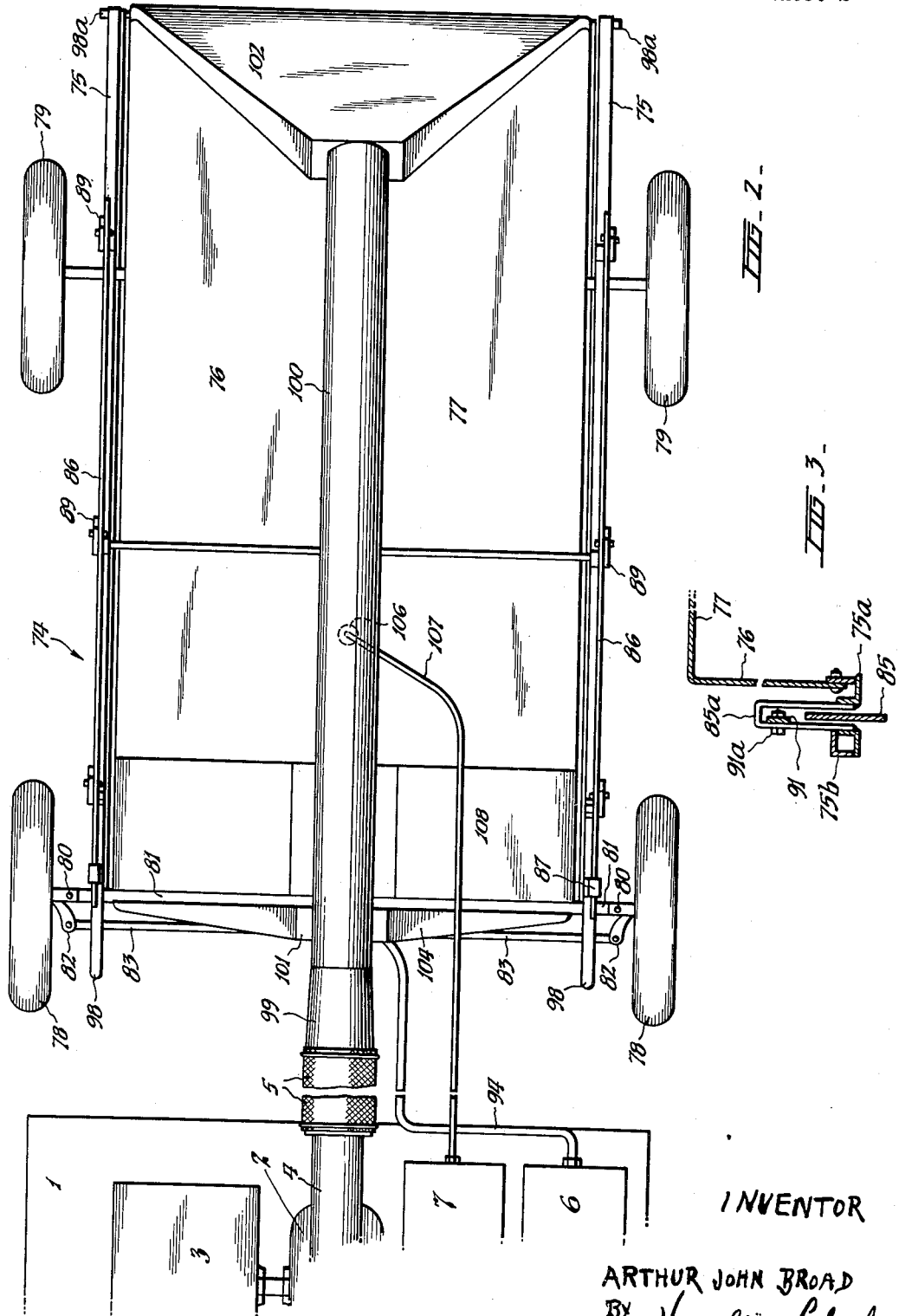

United States Patent Office 2,725,875
Patented Dec. 6, 1955

2,725,875

APPARATUS FOR BURNING FIRE BREAKS IN OPEN GRASS COUNTRY

Arthur John Broad, Pyramid, Victoria, Australia

Original application November 24, 1950, Serial No. 197,262. Divided and this application November 26, 1952, Serial No. 322,710

Claims priority, application Australia November 28, 1949

3 Claims. (Cl. 126—271.2)

This invention relates generally to the apparatus the subject of my copending application Serial No. 197,262, filed on November 24, 1950, now Patent No. 2,709,998, and is a division thereof, and in particular to an apparatus to be towed or hauled by a motor vehicle and used in open grass country for burning fire breaks or pre-burnt strips to check and prevent grass fires from spreading.

The present invention is directed to apparatus whereby a fire break is burnt in an enclosure towed by a motor vehicle and into which is directed a strong air current to support combustion sufficiently in advance of an extinguishing air current to enable a strip to be burnt before the burning grass is put out by the extinguishing air current.

In the course of extended trials I have found that in order to be effective, certain conditions, hereinafter fully explained, relating to the flow and discharge of the extinguishing air current and the disposition of igniting apparatus in the enclosure must be complied with, moreover, it has been found that for efficient air discharge, the air flow from the generating blower or fan should be as short and direct as possible.

Now the principal objective of this invention is the provision of firebreak burning apparatus of simple construction which is towed by a power driven vehicle so as to be traversed at relatively high speed over grassed country to burn a fire break, as it travels.

A further object of the invention is to provide a fire break burning apparatus which is traversed by a power driven vehicle over the ground surface, and forms therewith an enclosure wherein the grass is burnt to make a fire-break as the apparatus travels, and which is specially advantageous, though not exclusively adapted for use, in hot weather and strong winds.

In achieving this further object and according to the invention, a fire break burning apparatus to be towed by a power driven vehicle comprises a horizontally disposed frame having tubular members for supplying water to front and rear spray jets, a casing carried by the frame and open to the ground at the bottom, transport wheels supporting the frame and casing, a grass intake opening at the front of the casing, an air conduit flexibly connected with a power driven blower on the vehicle and positioned centrally and longitudinally above the casing, air discharge nozzles connected with said air conduit and located at the front and rear of the casing, at least one burner mounted within the casing and supplied with liquid fuel under pressure, flexible floating slides carried at the sides of the casing and maintained in ground engagement, and a chimney or stack extending upwardly from the top of the casing for discharge of products of combustion of grass burnt within the casing.

An illustrative apparatus in accordance with the invention for burning firebreaks in open grass country is depicted in the accompanying drawings.

In these drawings:

Fig. 1 is a side elevation of the firebreak burning apparatus which is disposed at the rear of and towed by a motor vehicle.

Fig. 2 is a plan of the firebreak burning apparatus illustrated in Fig. 1.

Fig. 3 is a section on the line 3—3 of Fig. 1.

Referring to these drawings in more detail, the numeral 1 designates generally a motor truck having mounted upon the tray thereof a centrifugal blower 2 of required capacity which is drive-connected with a suitable engine or power plant 3, indicated diagrammatically in Fig. 2.

Upon the outlet of the blower 2 there is mounted a bend 4 which is directed rearwardly as shown.

Connected to the outlet of the bend 4 is a flexible air tube or conduit 5 constructed of canvas or the like.

The towed firebreak burning apparatus indicated generally by 74 has a frame 75 constructed of suitable metallic tubing, on which is secured a sheet metal casing 76 closed at the top 77 and open at the bottom and having side and end walls.

The frame 75 and casing 76 are carried upon transport wheels 78 and 79, the front wheels 78 being pivoted at 80 on the ends of an axle 81 and connected by arms 82 and drag link 83 with a tow bar 84 whereby the unit is connected to the rear of the truck 1.

The tow bar 84 is pivoted at 84a, and the front wheels 78 are actuated by the tow bar so as to function as steering wheels in traversing bends or corners.

To form an effective ground seal at the sides of the casing 76 to prevent lateral spread of fire, there are provided plates or flaps 85 which are guided for vertical movement and are free for ground engagement and to rise and fall in passing over inequalities in the ground surface.

The plates 85 may be raised clear of ground engagement as in traversing sharp corners, by lifting means manually actuated from the truck tray and comprising operating bars 86 slidable in bearing brackets 87 secured to the upper tubular members 88 of the frame 75, bell crank levers 89 and links 90.

The frame 75 is provided with inner and outer parallel members 75a and 75b connected by yokes 85a, and the plates 85 are guided for vertical movement and maintained upright by the spaced frame members 75a and 75b in traversing the ground surface, see Fig. 3.

The plates 85 are drawn over the ground surface by arms 91 pivoted upon the yokes 85a at 91a and connected by pins 92 to lugs 93 on the plates to which are also connected the links 90.

The members of the tubular frame 75 comprise conduits for water and are connected by a flexible pipe 94 with a water pump 6 shown diagrammatically on the truck tray.

Branch pipes 95 extend from the pipe 94 to the lower tubular members 96 of the tubular frame 75, and the water is conducted through vertically disposed members 97 of the frame to the upper members 88, the forward ends of which are fitted with water spray jets 98 while the rear ends are provided with connections 98a for hoses for manual use.

The flexible air conduit 5 is connected to an air tube 99 carried on the firebreak burning apparatus 74 and divided into two branches 100 and 101.

The branch 100 is extended to the rear of the unit and is provided with a fish tail discharge outlet or nozzle 102, which at the end is turned inwardly at 103 into the casing 76 so as to direct the air flow forwardly therein.

The branch 101 is directed downwardly and is widened to comprise a fish tail nozzle 104, which at the lower end is turned inwardly at 105 to direct the air from the branch rearwardly into the casing 76.

Beneath the inturned end 105 there is a transverse opening in the forward end of the casing of sufficient height or width to provide an entrance for grass into the space within the casing 76, as the equipment travels. This space comprises a combustion chamber wherein the grass is burnt, ignition being effected by one or more burners 106 supplied with liquid fuel through pipes as 107, connected with a fuel container 7 under pressure on the truck.

Air to support combustion of the grass is supplied through the nozzles 102 and 104, and smoke and products of combustion escape through a chimney 108, which comprises a support for the air tube extension 99 and the air tube branches 100 and 101. The chimney 108 is fitted with a suitable wire screen spark arrester not shown.

Internal baffles (not shown) are provided in the casing 76 to prevent interference by the inflowing air from the nozzles 102, 104 with the chimney draught, and air splitters (not shown) are provided in said nozzles.

As the firebreak burning apparatus is towed by the truck 1, grass enters the front of the combustion chamber through the transverse opening, and upon being ignited by the burner 106 is burnt within the former. The ground engaging plates or flaps confine the burning grass within the combustion chamber and prevent ignition of grass external thereto.

Any grass not completely consumed is extinguished by the strong air current entering the combustion chamber from the rear nozzle 102.

Spread of fire from the front end of the combustion chamber is prevented by the air blast entering the chamber from the front nozzle 104, while any grass ignited externally to the chamber is extinguished by the water sprays emerging from the jets 98, and by means of water discharged through hoses attached to the connections 98a.

The firebreak burning apparatus above described may be arranged for towing by a tractor in lieu of the truck 1, and in such an alternative arrangement, air blowers would be carried at the front and rear of the apparatus and arranged to discharge air through front and rear nozzles into the combustion chamber.

The air blowers may be driven by separate power plants or drive connected with the power take-off of the tractor.

Such an alternative equipment would be provided with containers for liquid fuel for the burner 106 and water for jets 98 and hose connections 98a, the water being supplied by a power driven pump as hereinbefore described.

I claim:

1. An apparatus for burning firebreaks in open grass country, comprising a powered vehicle, having mounted thereon a power-driven blower, water supplying means and a container for liquid fuel; and a wheeled mobile firebreak burning unit towed by the vehicle and including a rectangular frame having side members braced in parallel relation, front and rear wheels supporting the rectangular frame, towing means connecting the frame with the vehicle, an elongated bottomless casing mounted upon the frame and provided with a closed top, and side, front and rear walls to form with the underlying ground surface a combustion space and having the lower edge of the front wall spaced above ground level to form a transverse opening across the front of the casing for entry of herbage into the casing to be burnt in the combustion space, a burner for igniting the herbage disposed within the front portion of the casing, flexible tubing connecting said burner with the liquid fuel container, a flexible air conduit extending rearwardly from the power driven blower, an air tube system connected to said air conduit and mounted on the casing and including a first branch terminating in a rearwardly directed nozzle positioned at the front of the casing to discharge air into the latter to support combustion, a second rearwardly extended branch in the air tube system terminating in a forwardly directed nozzle positioned at the rear of the casing to discharge air into the latter to extinguish incompletely burnt herbage, water spraying means incorporated in the frame, flexible tubing connecting said spraying means with the water supplying means so that a water spray is emitted for quenching smouldering herbage, ground sealing means yieldably engageable with the ground surface and supported by the frame at each side of the casing to prevent lateral spread of fire from said casing, and a chimney stack on the casing for discharge of the products of combustion of the herbage.

2. An apparatus according to claim 1; wherein the rectangular frame is comprised of tubular lateral frame sections having upper and lower horizontally disposed members connected by vertical members, said tubular frame sections are connected by said flexible tubing with the water supply means and carry said water spraying means.

3. An apparatus according to claim 1; wherein said ground sealing means include vertically disposed guideways carried by the frame at the sides of the casing, ground engaging plates pivotally connected to and guided for rising and falling sliding movements in said guideways, and manually operable means for raising and maintaining the ground engaging plates above and clear of the ground surface.

References Cited in the file of this patent

UNITED STATES PATENTS

| | | |
|---|---|---|
| 531,648 | Risdon et al. | Jan. 1, 1895 |
| 1,112,241 | Ward | Sept. 29, 1914 |
| 1,458,070 | Long et al. | June 5, 1923 |
| 1,571,882 | Belanger | Feb. 2, 1926 |
| 1,629,044 | Morter | May 17, 1927 |
| 1,849,411 | Silva et al. | Mar. 15, 1932 |
| 1,863,920 | Costa | June 21, 1932 |